(No Model.)
M. B. PATTERSON.
HORSE POWER.
No. 386,026. Patented July 10, 1888.
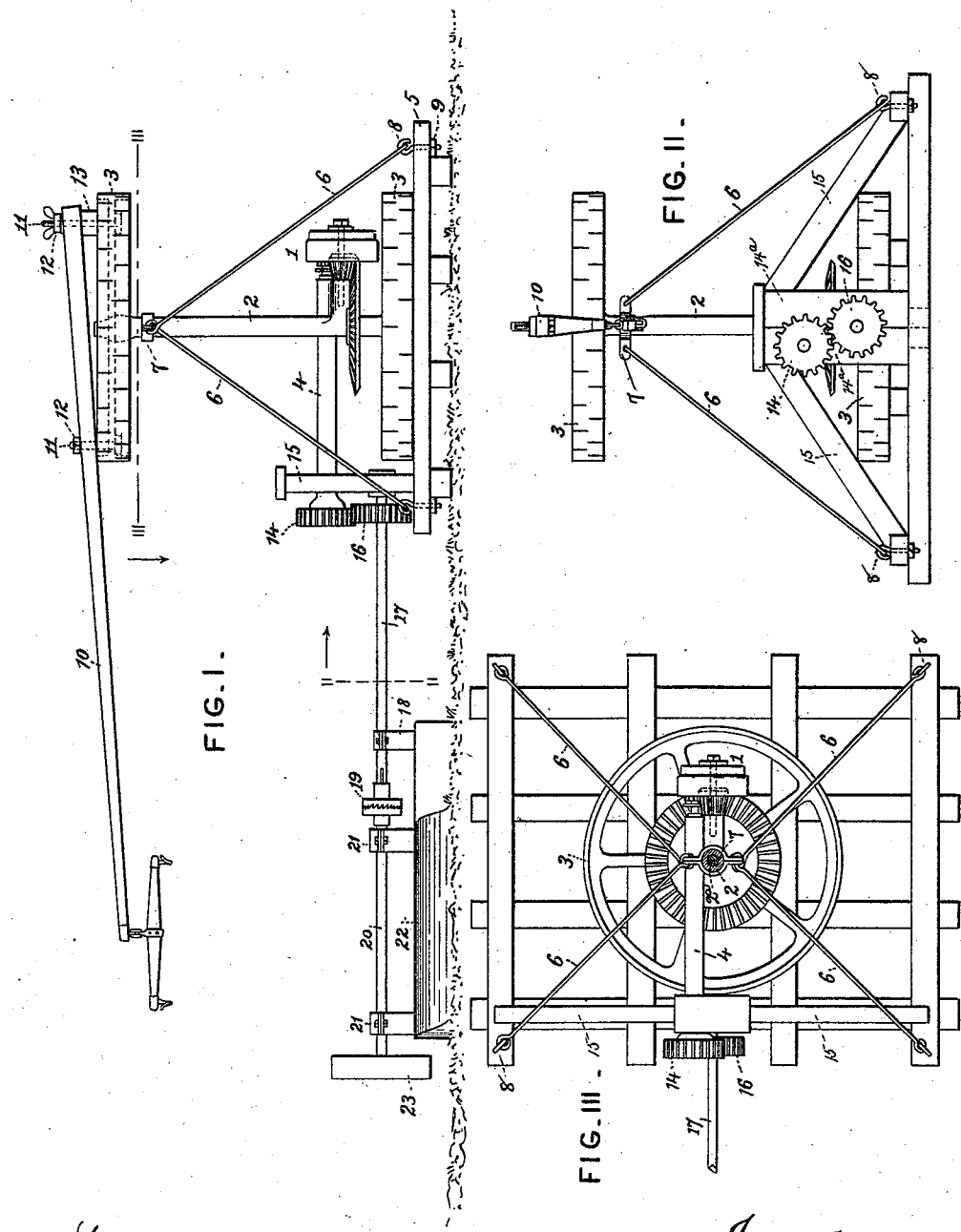
Attest:
Geo. T. Smallwood.
Geo. L. Wheelock.
Inventor.
M. B. Patterson.
By Knight Bros.
Attys

United States Patent Office.

MARK B. PATTERSON, OF QUEEN CITY, MISSOURI.

HORSE-POWER.

SPECIFICATION forming part of Letters Patent No. 386,026, dated July 10, 1888.

Application filed April 18, 1888. Serial No. 271,023. (No model.)

*To all whom it may concern:*

Be it known that I, MARK B. PATTERSON, a citizen of the United States, residing at Queen City, in the county of Schuyler and State of Missouri, have invented certain new and useful Improvements in Horse-Powers, of which the following is a specification.

My invention consists in converting a mowing-machine into a horse power by dispensing with certain parts and by the addition of others for the purpose of pumping water, sawing wood, or, in fact, for any purpose for which a horse-power may be used. These objects are accomplished by removing the knife, knife-bar, pitman rod, tongue, and pitman-wheel of the mowing-machine and taking the remainder—that is, the frame of the machine, the wheels, and gearing—and turning the whole over on its side upon a platform, whereto it is connected by means of braces and brackets, and applying to the upper wheel the lever constituting a shaft, to which a horse may be attached for turning the upper wheel, and consequently operating the gearing of the mower. In place of the pitman-wheel I substitute a cog-wheel, which brings it near to the left-hand side of the machine, as the gearing and the pitman-wheel are nearer that side than the other. With this cog-wheel meshes another cog-wheel fixed on a tumbling-rod which is in or about in a horizontal position and is journaled at one end in a bracket fixed to the platform. The other end of the tumbling-rod has a clutch connection with the line-shaft common in horse-powers. To the outer end of the line-shaft is fixed the belt-pulley.

This invention will prove itself very useful to farmers or those who follow agricultural pursuits, for the reason that most farmers use mowing-machines, and by adopting my additions to the mower they may easily obtain a horse-power which will prove very useful.

In order that my invention may be fully understood, I will proceed to describe it with reference to the accompanying drawings, in which—

Figure I is a side elevation of the device embodying my invention. Fig. II is a front elevation of the same; and Fig. III is a sectional plan view on the line III III, Fig. I.

In the drawings, 1 is the gearing; 2, the shell within which revolves the axle $2^a$; 3, the wheels, and 4 the box in which the shaft to which the pitman-wheel of the mower is attached is placed. I prefer to use mowers in which the gearing is near the left-hand side of the machine. The knife, knife-bar, pitman-rod, tongue, and pitman-wheel being removed, the left-hand wheel is reversed, so that there will be no clicking sound when the other wheel, the axle, and gearing are rotated. The parts of the mower now remaining are then turned on the side, the left-hand wheel resting on a frame or platform, 5. The platform is composed of cross-pieces to enable the ready tying of the mower thereto.

7 is a clasp-collar placed around the axle-shell, to which are connected four braces, 6, which radiate therefrom to each corner of the frame or platform, whereto their hooked ends are connected by means of hooked bolts 8, passing through the platform and secured on the under side thereof by nuts 9.

The lever 10 is secured to the upper driving-wheel 3 of the mower by means of bolts and nuts 11 12, and between the outer end of the lever, through which one of the bolts passes, and the wheel 3, through which the bolt also passes, is interposed a block, 13, which throws this end of the lever up and the outer end, to which the horse is attached, down. The cog-wheel 14, which takes the place of the removed pitman-wheel, is supported in a relatively-fixed position on its shaft by means of braces 15, extending up from the platform 5. With the cog-wheel 14 gears another cog-wheel, 16, fixed near one end of a rod or shaft, 17, and this rod has bearing at each end in uprights $14^a$, supported by braces 15, and in block 18, respectively. The outer end of the rod 17 is connected by a clutch, 19, with one end of a line-shaft, 20, which shaft is supported in journal-boxes 21 on a suitable base, 22.

23 is the belt-pulley, around which the belt from the pulley of the machinery to be driven passes.

Having thus described my invention, the following is what I claim as new therein and desire to secure by Letters Patent:

1. The combination, with the ordinary gearing, axle, and driving-wheels of a mowing-machine, of a lever secured to one of the driving-wheels of the mower, a rod having suitable connection with the gearing of the mower, and a line-shaft provided with a pulley having suitable connection with the rod, substantially as and for the purpose herein set forth.

2. The combination, with the ordinary gear, axle, and driving-wheels of a mower, and a platform on which it is supported on its side, of a collar surrounding the upper end of the axle-shell, and braces extending downwardly therefrom, connected by tightening-bolts with said platform, a lever to which a horse may be attached secured to the upper wheel, and suitable devices for conveying power to the machinery to be driven having gear-connection with the gearing of the mower, substantially as and for the purpose herein set forth.

MARK B. PATTERSON.

Witnesses:
E. F. PATTERSON,
J. H. CROZIER.